United States Patent
Pellenc (10) Patent No.: US 9,894,839 B2
(45) Date of Patent: Feb. 20, 2018

(54) METHOD AND DEVICE FOR DEPLOYING AND RETRACTING A TARPAULIN FOR COLLECTING SMALL FRUIT, AND HARVESTING MACHINES USING SAME

(71) Applicant: PELLENC (SOCIÉTÉ ANONYME), Pertuis (FR)

(72) Inventor: Roger Pellenc, Pertuis (FR)

(73) Assignee: PELLENC (SOCIETE ANONYME), Pertuis (FR)

(*) Notice: Subject to any disclaimer, the term of this patent is extended or adjusted under 35 U.S.C. 154(b) by 41 days.

(21) Appl. No.: 15/022,136

(22) PCT Filed: Oct. 16, 2014

(86) PCT No.: PCT/FR2014/052635
§ 371 (c)(1),
(2) Date: May 23, 2016

(87) PCT Pub. No.: WO2015/075337
PCT Pub. Date: May 28, 2015

(65) Prior Publication Data
US 2016/0270293 A1    Sep. 22, 2016

(30) Foreign Application Priority Data
Nov. 20, 2013 (FR) .................................... 13 61396

(51) Int. Cl.
A01D 46/26    (2006.01)
(52) U.S. Cl.
CPC ........ *A01D 46/26* (2013.01); *A01D 2046/262* (2013.01)

(58) Field of Classification Search
CPC ......................... A01D 46/26; A01D 2046/262
(Continued)

(56) References Cited

U.S. PATENT DOCUMENTS 3,145,521 A * 8/1964 Herbst ................... A01D 46/26
56/329
3,535,864 A * 10/1970 Smith .................... A01D 46/26
56/329

(Continued)

FOREIGN PATENT DOCUMENTS

EP    0133334 A1    2/1985
FR    2556924 A1 *  6/1985 ............. A01D 46/26
(Continued)

OTHER PUBLICATIONS

International Search Report for corresponding International Application No. PCT/FR2014/052635.

*Primary Examiner* — John Weiss
(74) *Attorney, Agent, or Firm* — Egbert Law Offices, PLLC (57) ABSTRACT

An apparatus for harvesting small fruit detached from fruit trees or bushes has a tarpaulin, a winding shaft fastened to a proximal end of the tarpaulin, a first bearing structure supporting the winding shaft, a rotary drive motor coupled to the winding shaft, at least one band having bending and shape memory, a winding drum connected to one end of the band, and a second bearing structure supporting the winding drum. The band has an end connected to the distal end of the tarpaulin. A distal end of the band pushes the distal end of the tarpaulin so as to move the tarpaulin away from the winding shaft so as to deploy the tarpaulin above the ground.

18 Claims, 10 Drawing Sheets

(58) Field of Classification Search
USPC .................................................. 56/329, 328.1
See application file for complete search history.

(56) References Cited

U.S. PATENT DOCUMENTS

| | | | | |
|---|---|---|---|---|
| 3,808,786 | A * | 5/1974 | Beckens | ................ A01D 46/26 56/329 |
| 3,896,612 | A * | 7/1975 | McHugh | ................ A01D 46/26 56/329 |
| 4,269,021 | A * | 5/1981 | Friday | .................... A01D 46/26 56/329 |
| 7,117,661 | B2 * | 10/2006 | Chiel | ..................... A01D 46/26 56/329 |

FOREIGN PATENT DOCUMENTS

| | | | | |
|---|---|---|---|---|
| FR | 2597704 | A1 | 10/1987 | |
| FR | 2905051 | A1 * | 2/2008 | ............. A01D 46/26 |
| FR | 2946832 | A1 | 12/2010 | |

\* cited by examiner

METHOD AND DEVICE FOR DEPLOYING AND RETRACTING A TARPAULIN FOR COLLECTING SMALL FRUIT, AND HARVESTING MACHINES USING SAME

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The innovation concerns the field of harvesting of small fruit such as, for example olives, almonds, nuts, hazelnuts, chestnuts, cherries, mirabelles, plums, coffee-shrub berries, etc. . . . More precisely, it concerns the collection of small fruit which are detached from fruit trees or bushes by means of portable equipment (combs) or mechanized shakers, or by automated equipment, and are collected on a tarpaulin placed below the fruit-bearing branches of said trees or bushes and above the ground so that they will then be gathered and collected by using the roll-up action of said tarpaulin.

The present invention thus concerns a device for automatically extending a tarpaulin below the fruit-bearing branches, then to accompany its retraction in order to collect the fruit detached from the tree and fallen on said tarpaulin. It also relates to the process of deployment and retraction of such a tarpaulin. On the other hand, it applies to the self-propelled or drawn machinery equipped with such devices.

2. Description of Related Art Including Information Disclosed Under 37 CFR 1.97 and 37 CFR 1.98

For a long time tarpaulins or nets have been placed manually on the ground below fruit trees to be harvested, and to make the small fruit fall on said tarpaulins, for example by means of shakers or vibrations applied by some portable equipment or vibrators mounted on towed or self-propelled vehicles, and then to harvest the small fruit detached from the trees by gathering them while the tarpaulin is being rolled up. However, placement of the tarpaulin and its retraction require the presence of at least two workers and a considerable amount of time for installing and retracting the latter below the tree. This manual operation also cannot be carried out at night, as the manipulations and the environment present dangerous obstacles for operators working in the dark.

Document FR-A-2597704 describes a fruit harvesting machine which includes a receiving installation of fruit detached from the trees, built in two parts, each equipped with a receptacle provided, laterally, with a soft, deployable tarpaulin, and capable of being connected, in an articulated manner, one behind the other, the front part of said installation being built so it can be installed on the side of a farm tractor, whereas the rear part is built so it can be attached, in an articulated manner, to an element of the chassis of said front part. The distal edge of the tarpaulins is provided with handles so they can be unfurled and manually deployed under the tree to be harvested.

This machine which requires two separate attaching systems and two motorized devices for rolling up tarpaulins is fairly complex and costly; it is relatively space-consuming; it requires manual interventions for deployment and positioning the tarpaulins and several workers, but in spite of their presence the harvest can only proceed at a slow pace that is incompatible with the harvesting work in large olive groves or orchards.

Document FR-2556924 describes a device for handling and moving tarpaulins for the harvesting of fruit, intended to reduce the disadvantages of the system disclosed in the preceding document. This involves a tractor-drawn trailer on which a fruit-collecting tarpaulin is rolled up, said tarpaulin being deployed automatically below the trees. In order to avoid the disadvantages of a manual deployment/retraction of this tarpaulin, it is proposed to perform the deployment operations of the tarpaulin by pulling it by means of motorized trucks with driven wheels, each truck being equipped with a hydraulic motor, the whole being controlled from a tractor by a single person.

These trucks are however space-consuming, relatively slow to be moved during the deployment and retraction phases of the tarpaulin and require a complex mechanical platform to transport them on the trailer when the latter is moved from one tree to the next or on the roadway.

Furthermore, their control and their synchronization require the retraction and deployment of hydraulic hoses for the control of their motor which are subject to aggressive friction on the ground when the tarpaulin is deployed or retracted, reducing their useful life under these operating conditions. It is also often the case that machines perform the mechanical picking of the fruit, consisting of self-driven equipment which may, if necessary, need to roll on the surface of the tarpaulin and thereby damage the hydraulic control hoses of the trucks. The bursting of one or several of these hoses, apart from the fact that this prevents further utilization of the tarpaulin, is harmful to the environment due to the spillage of hydraulic fluid under pressure.

Finally, this system functions all right on a flat and even terrain, but it is very difficult to maintain a straight trajectory of the trucks on a sloping or hilly terrain without human intervention to correct it. Their trajectory for the deployment and retraction of the tarpaulin depends also on the terrain they encounter, as the terrain can very often be different for each of the drive trucks, thus causing their trajectory effectively to become random and resulting in the duration of overall operations of retraction and deployment to be long and unpredictable, depending on the terrain.

Document FR-2946832 proposes another system for the deployment of a small-fruit gathering tarpaulin by integrating inflatable tubes into it, thus ensuring a simple and rapid deployment of the latter, regardless of the conditions of the terrain. Such a system has however the disadvantage of being fragile, particularly if a harvesting machine needs to run on said tarpaulin, thus risking to pierce the tube and consequently rendering the tarpaulin effectively unusable because it can be neither deployed nor retracted, it also requires considerable volumes of compressed air to ensure the rapid deployment of the tarpaulin, adding to the complexity of the whole system by bringing in fuel-guzzling compressors and bulky fuel tanks. Finally, the replacement of the tarpaulin requires effectively the replacement of the tubes integrated into it, making maintenance operations of said tarpaulin more expensive.

Document EP-0133334 proposes a retraction and deployment system of a small-fruit gathering tarpaulin by means of a mechanical structure with articulated arms. Obviously, this type of structure is heavy and bulky and does not allow a self-driven machine to roll on the tarpaulin without irreparably damaging this metal structure. It is also clear that the complexity of installing such a system only increases with the size of the tarpaulin, the length of the articulated arms being linked to the dimensions of the tarpaulin.

BRIEF SUMMARY OF THE INVENTION

The present invention aims to alleviate these disadvantages by proposing a simple and efficient automatic tarpaulin retracting/deploying device that is mounted on a pulled trailer or on a self-driven vehicle and without the aforementioned disadvantages of the state of the art.

According to the invention, this goal has been achieved thanks to a gathering device of small fruit, including, in a manner known in itself, a tarpaulin delimited by a distal end and a proximal end, which is fastened by means known as such on a winding shaft coupled to driving elements; this tarpaulin may feature a median split which extends from its distal end and finishes in an opening made in the center of said tarpaulin, said device also featuring means for deploying and retracting this tarpaulin, remarkable in that said means of deployment and retraction include at least one and preferably a plurality of bands having a capacity for bending and shape memory, with one of their ends being connected by means known as such to a winding drum the rotational axis of which is positioned in parallel or essentially in parallel with the rotational axis of the winding shaft of the tarpaulin and on which are wound up said bands, the other end of each of these bands being connected to the distal edge of said tarpaulin so that during their unwinding the deployed portion spontaneously assumes a straight configuration with a certain rigidity allowing their distal end to push the distal edge of the tarpaulin by moving it away from its winding shaft and, consequently, achieves the unwinding of the latter above the ground.

According to an advantageous implementation, the distal end of said bands is connected to the distal end of the tarpaulin through the intermediary of drive frames.

According to an advantageous implementation, the distal end of the tarpaulin is provided with means facilitating its movement on the ground, these means consisting of wheels or skids mounted on the drive frames.

It is also clear that thanks to this device, the unwinding of the tarpaulin occurs in a direction perpendicular to the winding shaft of the latter, while adapting to the surface of the terrain, its obstacles and its gradient.

The band(s) constitute(s) the drive elements for pushing or pulling the drive frames and provide the advantage of severely limiting the possibility of angular deviation of the latter in the plane of the tarpaulin, while permitting significant deviation in the vertical plane so as to adapt to the shape of the terrain.

The device according to the invention offers several interesting advantages. In particular:

Rapid unwinding (in less than 5 seconds for a 9 meter wide tarpaulin deployed over a length of 10 m), its unwinding being slowed to ensure proper transportation of the fruit, towards a conveyor onto which the fruit is dumped;

Winding/unwinding of the tarpaulin under the same conditions on a flat or uneven terrain, with or without obstacles, and in particular in significantly sloping situations between the two distal ends of the tarpaulin;

Allowing the necessary passing on top of the tarpaulin of personnel and machinery involved in the mechanical harvesting of fruit without damaging the device;

Distinguishing the function performed by the tarpaulin from that performed by the means for winding and unwinding of the latter in order to simplify and reduce the cost of maintenance and/or replacement of the tarpaulin.

According to the device of the invention, the unwound portion of the band or of each of the number of bands positioned in parallel automatically acquires a certain rigidity due to the shape memory of the material said band or each of said bands is made of, on the other hand, this unwound portion presents a convex or concave profile, in a section taken in parallel to the rotational axis of the winding drum of said bands. This characteristic is of interest for reinforcing the rigidity of the bands and thereby limits their deviation in the plane of the tarpaulin in case of steeply sloping terrains. This rigidity can be achieved by a single, sufficiently wide band or by a plurality of less wide bands positioned in parallel. In the latter case, the height of the band in its unwound portion is more reduced and facilitates the passage of the tarpaulin between the ground and the fruit-bearing branches, especially when these are heavily laden with fruit and close to the ground.

According to the device of the invention, the bands which are at the same time rigid and flexible can be wound up flat on the drum(s) the rotational axis of which, being connected to the bearing structure of the device, is parallel or essentially parallel to the rotational axis of the tarpaulin also supported by said bearing structure.

According to an important characteristic, the unwinding of the bands is done with drive elements.

According to a preferred implementation, this unwinding is performed by a couple of counter-rotating rollers mounted on both sides of each band and providing the unwinding of the latter by friction. In addition, these rollers are shaped to guide the band and ensure the transition between the concave or convex profile of the deployed portion of the band and its flat winding around the drum, the band being in effect free to reassume its concave or convex profile after passing the couple of rollers.

According to another characteristic implementation, the winding drums of the bands are coupled to drive elements known as such, allowing their rotation to be braked in the direction of the deployment in order to accompany the unwinding of said bands without letting them unwind themselves by spring effect around the drums, one of the rollers of the counter-rotating rollers associated with each band being then coupled to drive element known as such, obtaining this unwinding by friction, as previously indicated, thus allowing, through the intermediary of the distal end of the latter, to push the drive frames towards the outside of the bearing structure in order to unwind the tarpaulin.

According to another characteristic implementation, the tarpaulin shaft coupled to drive elements known as such allowing the retraction of the tarpaulin, the winding drums of the bands also being coupled to drive elements working in combination with the drive elements of the tarpaulin shaft to accompany the winding of the bands, the counter-rotating rollers being then left free in rotation to ensure their function of guiding the bands. During this phase, the drive frames connected to the bands are pulled towards the bearing structure of the device by said band(s) and thus accompany the winding of the tarpaulin while keeping it slightly taut.

According to one implementation, the device includes means for maintaining slight tension of the tarpaulin during the phases of its deployment and retraction. The tightness of the tarpaulin is adjustable through said means in order to reduce, on the one hand, its friction on the ground during the unwinding and, on the other hand, to ensure the conveying of the gathered fruit towards the trailer or self-propelled vehicle during its retraction by means located on the tarpaulin and known as such.

According to another characteristic disposition, the means for maintaining the tension of the tarpaulin consist of drive elements such as a hydraulic motor, an electric motor or other (even elastic mechanisms such as spiral springs) coupled to the winding shaft of the tarpaulin, servo-driven with the drives for unwinding the bands (5) acting on the driving frame(s) and allowing to monitor the winding phase of the tarpaulin by regulating the wind-up drives of the bands and to be regulated by the deployment drives of the band in the unwinding phase of the tarpaulin.

According to another characteristic disposition, each rigid and flexible band is constituted by a metallic strip, for example made of steel, titanium, brass and preferably of stainless steel with a spring action or shape memory.

According to another characteristic disposition, each rigid and flexible band is constituted by a metallic strip with spring action preformed ahead of time in its concave shape by bending or profiling.

According to another characteristic disposition, each rigid and flexible band is constituted by a concave extruded strip of a composite material including fibers such as glass, carbon, Kevlar® or a mix of this type of fibers.

The invention also concerns a method for gathering small fruit detached from fruit trees or bushes by means of a soft tarpaulin unwinding itself around a rotary shaft coupled to a drive motor ensuring its retraction, this tarpaulin including a proximal end fastening to said shaft and a distal end, this method being noteworthy in that the unwinding of the tarpaulin is obtained by means of at least one and preferably of a plurality of bands featuring a capability of bending and shape memory wound around one or several winding drums with an axis parallel or essentially parallel to the rotational axis of the winding shaft of the tarpaulin, and the distal end of which is connected to the distal end of the tarpaulin, the deployed portion of the bands assuming automatically a straight shape and a property of rigidity thanks to which their distal end is capable of exerting a thrust on the distal end of the tarpaulin thus ensuring the deployment of the latter.

According to an advantageous implementation of the gathering method of the invention, the unwinding of the tarpaulin is obtained by the motorized unwinding of the bands, the tarpaulin winding shaft being put in free rotation or exerting a braking action during this unwinding phase, whereas the rewinding or retraction of the tarpaulin is achieved by the drive motor coupled to the winding shaft of said tarpaulin, the winding drum(s) of the bands being coupled to drives ensuring the retraction of the bands simultaneously with the retraction phase of the tarpaulin.

The invention also concerns the harvesting machines for small fruit featuring a gathering device with one or several of the characteristics described above.

BRIEF DESCRIPTION OF THE DRAWINGS

The afore-mentioned aims, characteristics and advantages and still more will become clearer from the detailed description which follows and the attached drawings in which.

Reference to said drawings is made to describe interesting, although by no means limiting examples of implementation of the device and application of the harvesting method according to the invention.

DETAILED DESCRIPTION OF THE INVENTION

Figure 1:
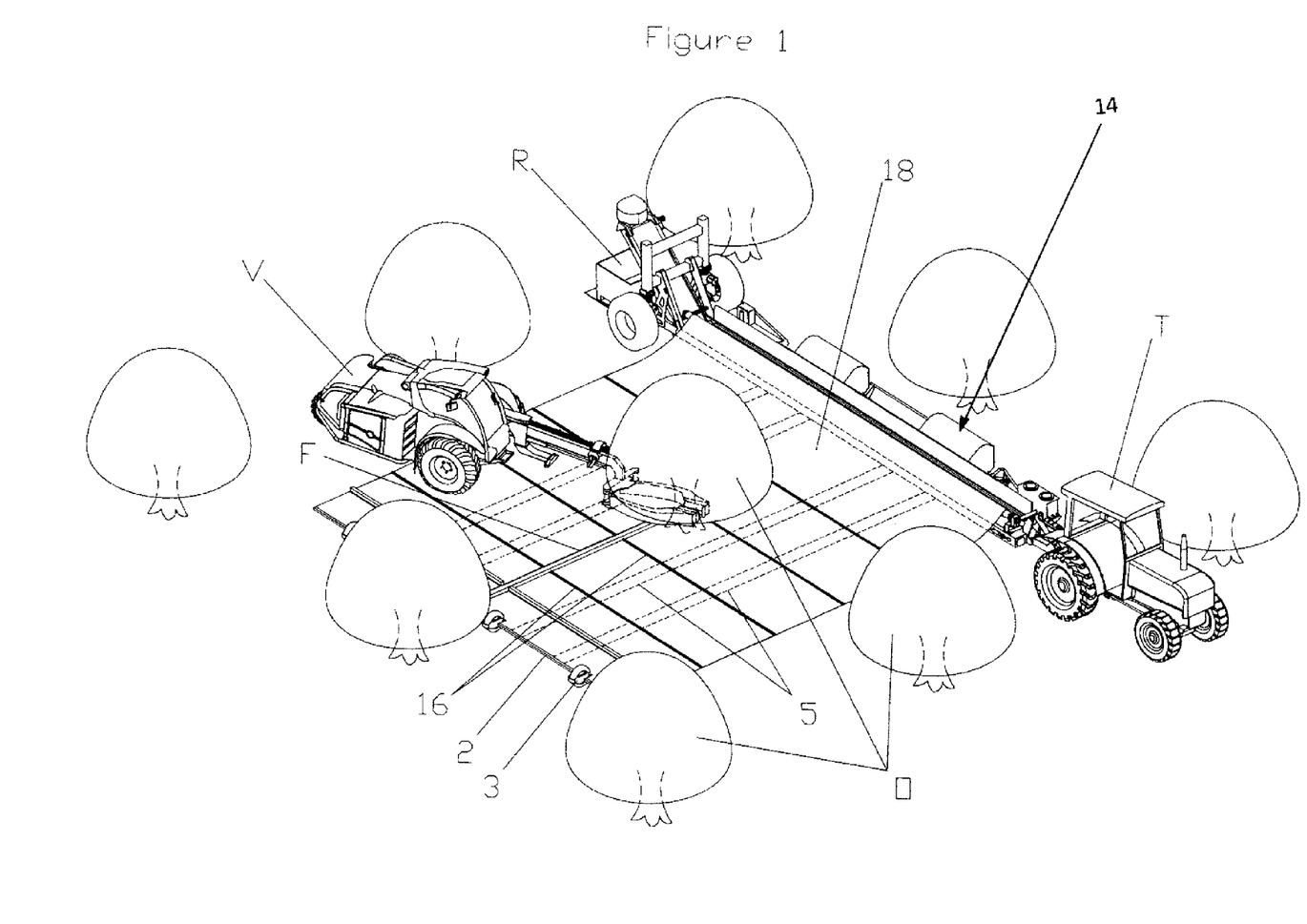
FIG. 1 is a perspective view illustrating an example of implementation applied to an installation of mechanized harvesting in a phase of harvesting small fruit such as olives or other, detached from a tree by means of a shaking machine.

FIG. 1 shows a preferred implementation of the device and the harvesting method of small fruit according to the invention.

According to this implementation, this device is supported by a bearing structure 4 installed on a trailer R attached to a tractor T, positioned in a row of an olive grove Θ, this harvesting device featuring a tarpaulin 18 deployed on the ground under the fruit-bearing branches of one of these olive trees, so as to harvest the fruit detached through the intermediary of a self-propelled harvesting vehicle V.

The bearing structure supporting the device of the invention could, of course, be installed on the lengthened chassis of a self-propelled machine purpose-built for the harvesting of small fruit.

The tarpaulin 18 may advantageously feature a median slit F which extends from its distal end and finishes in an opening C made in the middle of said tarpaulin. This opening features adequate means of tightness known as such and not shown, aiming at preventing olives from falling to the ground at said opening when the tarpaulin 18 is deployed in the harvesting position; in this manner the tarpaulin in effect completely surrounds the tree trunk and covers the entire collecting area located below the fruit-bearing branches of the tree. One notes in passing that the use of a heavy harvesting vehicle V can lead the latter to move on to the tarpaulin 18, and in particular on its side edges, justifying the need to avoid positioning any part of a retracting/deploying device of a tarpaulin in these lateral areas in order to prevent them from getting damaged.

Figure 2:
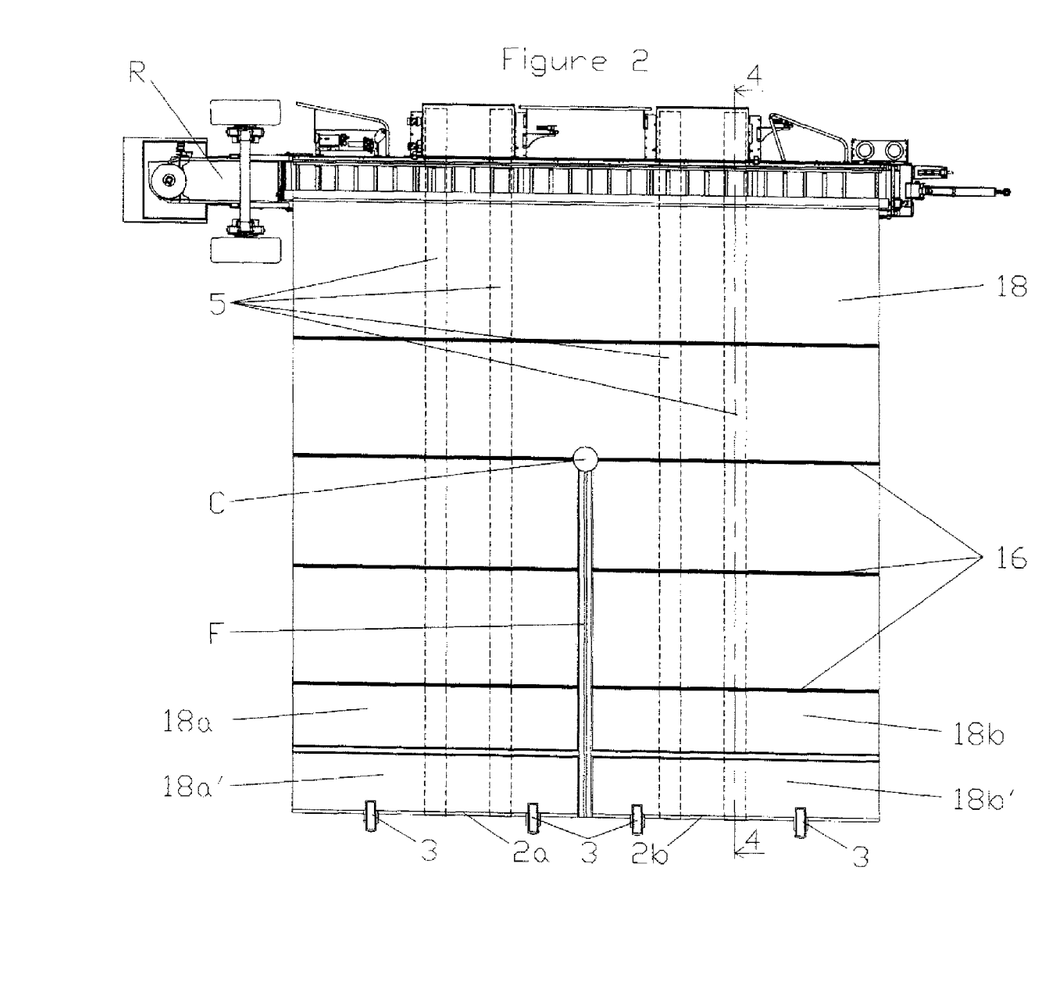
FIG. 2 is a view from above of this device with the tarpaulin deployed, the means of traction T and of collection V are not shown.
Figure 3:
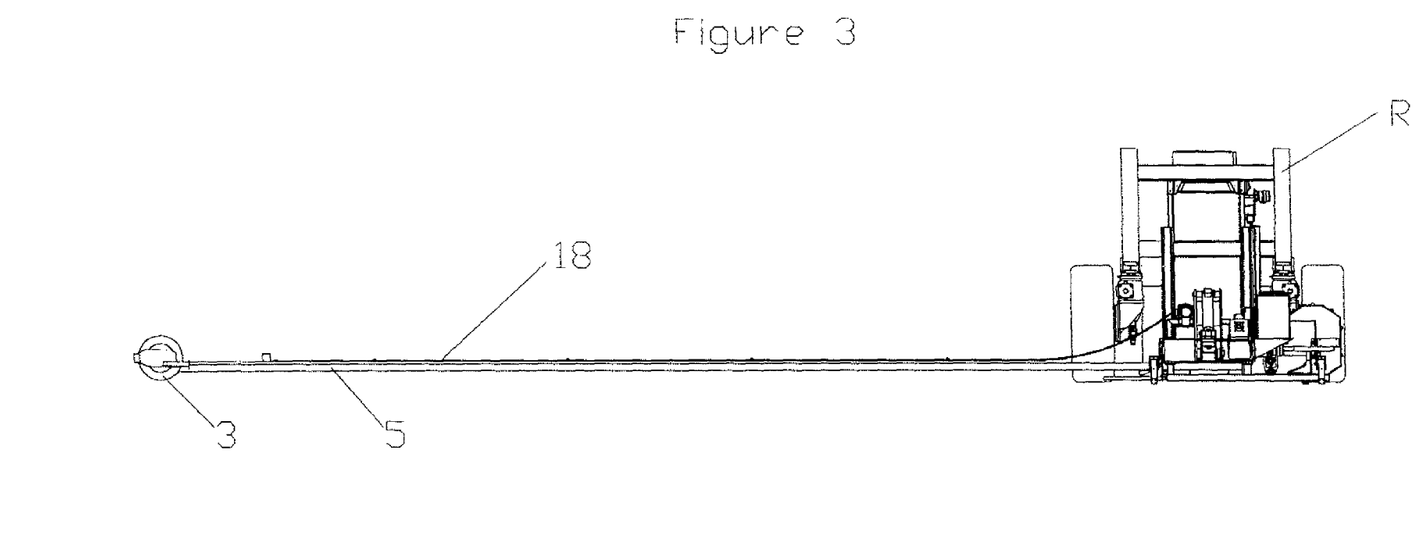
FIG. 3 is a side view of a mechanized harvesting installation featuring the application of the device according to the invention, with the tarpaulin deployed; the means of traction T and of collection V are not shown.

The distal half-part of tarpaulin 18 is thus constituted by two portions 18a, 18b delimited by the median slit F. The distal end of each of these portions is solidly and in a manner known as such connected to a driving frame 2a, 2b.

It is also clear that the trailer with the retracted tarpaulin is brought by the tractor T between the rows of trees and immobilized at the tree O to be harvested so that the entrance of the slit F of the tarpaulin coincides with the trunk of the latter so it can be deployed under the fruit-bearing branches of said tree.

It is specified that the term tarpaulin designates, in the present description, a surface suitable for collecting fruit detached from the tree when it is placed between the tree and the ground. In fact, this tarpaulin is made of a soft, solid material or perforated material like a net, that can frequently be retracted or deployed, around an axis and which can possess means suitable for carrying the fallen fruit on said tarpaulin when it is retracted, such as cross brace-laths 16 (FIG. 2).

Figure 4A:
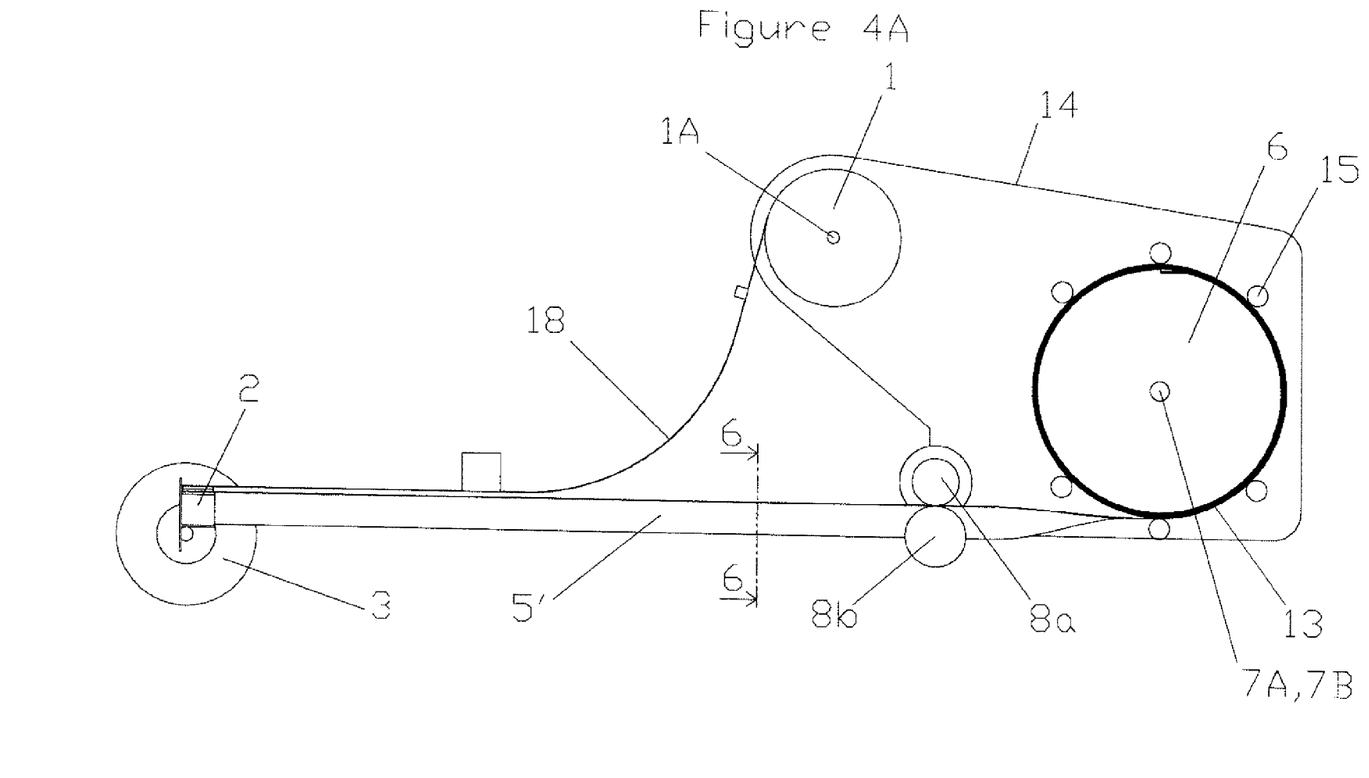
FIG. 4A is a section view along line 4-4 of FIG. 2, in schematic form and at a larger scale, illustrating the main components of the harvesting device according to a first implementation of the invention, considered at the beginning of a deployment phase of the tarpaulin.
Figure 4B:
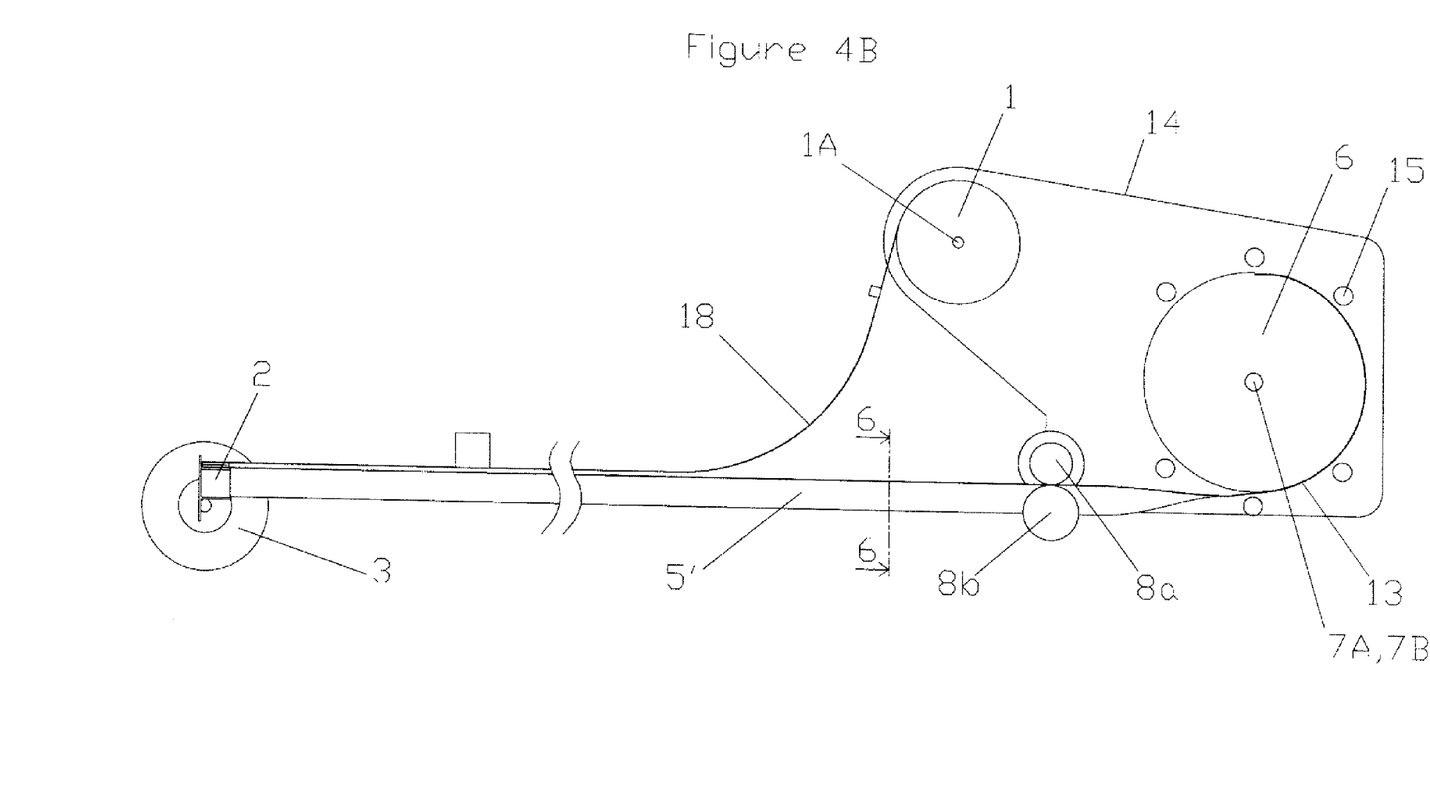
FIG. 4B is an analog view to FIG. 4A and shows the tarpaulin in the state of complete deployment.

The tarpaulin 18 is fastened, through the intermediary of its proximal end and by means known as such, on a winding shaft 1 supported by the bearing structure 14. The pulling chassis 2 or each pulling chassis 2a, 2b is integral with means facilitating the movement of the tarpaulin on the ground. These means may consist of wheels 3 (FIGS. 4A, 4B and 5A) or of skids or skis 4 (FIG. 5B) allowing the tarpaulin to be pulled during its deployment on the ground or to accompany its winding during its retraction phase.

The harvesting device features also means for deployment and retraction of the tarpaulin 18. According to an important characteristic of the invention, these means of deployment and retraction include at least one and preferably a plurality of bands 5 provided with bending and shape memory, wound up in spiral form around a winding drum 6 the rotational axis of which is positioned parallel or essentially parallel to the rotational axis of the winding shaft 1 of the tarpaulin 18. The opposite end of these bands 5 is connected to the distal edge of the tarpaulin and, according to the implementation shown, to the distal edge 18a' or 18b' of the portions 18a or 18b, respectively, of the tarpaulin. For example, these bands 5 have a width which may be between 20 cm and 1 m and a thickness between 0.2 mm and 2 mm.

According to the implementation shown on the attached drawings, the device includes four bands with a flat width of 300 mm and a thickness of 1 mm.

Each band 5 is flexible so it can be wound around a winding drum 6. This winding drum or each winding drum 6, supported by the bearing structure 14, is mounted so that it turns around a rotational axis 7A, 7B.

The winding drum or each winding drum 6 is coupled to a motorized drive known as such (not shown), for example constituted by a hydraulic motor for the retraction of said band on said drum 6 and traveling along during its deployment while allowing to maintain tension of said band which is needed to keep it tight on said drum. It is in fact important to prevent the drum from rotating freely which would cause the unwinding of the spiral winding around said drum, because of spring action.

Each band 5 may advantageously consist of at least one strip, preferably made of stainless steel with spring power or shape memory capable of winding itself flat around a drum and with its unfurled part 5' automatically assuming a straight shape and becoming rigid. According to the invention, the unfurled portion of band 5', between its wound up portion on the winding drum 6 and its distal end connected to the distal edge 18a' or 18b' of the tarpaulin 18 becomes straight and acquires a property of rigidity that is appropriate for pushing the drive frames 2a, 2b during their deployment, and to pull said drive frames during their retraction. This rigidity is reinforced by the fact that the bands 5 have a shape memory thanks to which they automatically acquire a section of concave shape during their deployment. When the bands 5 each consist of a single strip the concavity 19 of their deployed portion 5' is preferably oriented towards the ground, since with this orientation one avoids damaging the tarpaulin on contact with the longitudinal edges of the bands.

According to the example shown (FIG. 2) the device features two pairs of spaced bands 5 positioned on either side of the median axis of the tarpaulin and the slit F. Each distal end 18a',18b' of the portions 18a,18b of the tarpaulin is equally equipped with a drive frame, respectively 2a, 2b, provided with two wheels 3 or skids 4.

The shape memory which the bands 5 present may result from the nature of the material said bands are made of, or from a particular process or treatment of this material known as such.

The device also includes drives for the deployment of the bands 5.

According to the implementation shown, this deployment is achieved by pairs of counter-rotating guide rollers 8a, 8b their axes of rotation being parallel to the axis of the winding drum(s) 6 of the bands 5, and placed on either side of the deployed portion of the band, preferably at a reduced distance from the winding drums 6. The bands thus find themselves squeezed between the rollers of these counter-rotating pairs of rollers. The latter cooperate with each other to lead to the deployment of the bands through friction, one (8a) of these guide rollers 8a, 8b being connected to a driving mechanism constituted for example by a hydraulic motor providing the unwinding of band 5 from its drum 6.

The circumferences of the rollers of each pair of counter-rotating guide rollers 8a, 8b present cooperating profiles that facilitate the passage from the flat form of the band at the wound-up state to the crown shape of said band in the deployed state.

The two rollers of each pair of counter-rotating guide rollers may have, on their periphery, a cylindrical shape. According to a preferred implementation, they have, peripherally, complementary shapes. One (8a) of these rollers, presents, on its periphery, a concave section, whereas the other roller (8b) presents, on its periphery, a convex shape. This complementary shaping of the circumferences of the rollers allows accompanying the formation of the curved section acquired by the bands 5 from the time they leave the spiral and flat winding supported by the winding drums 6.

Figure 6:
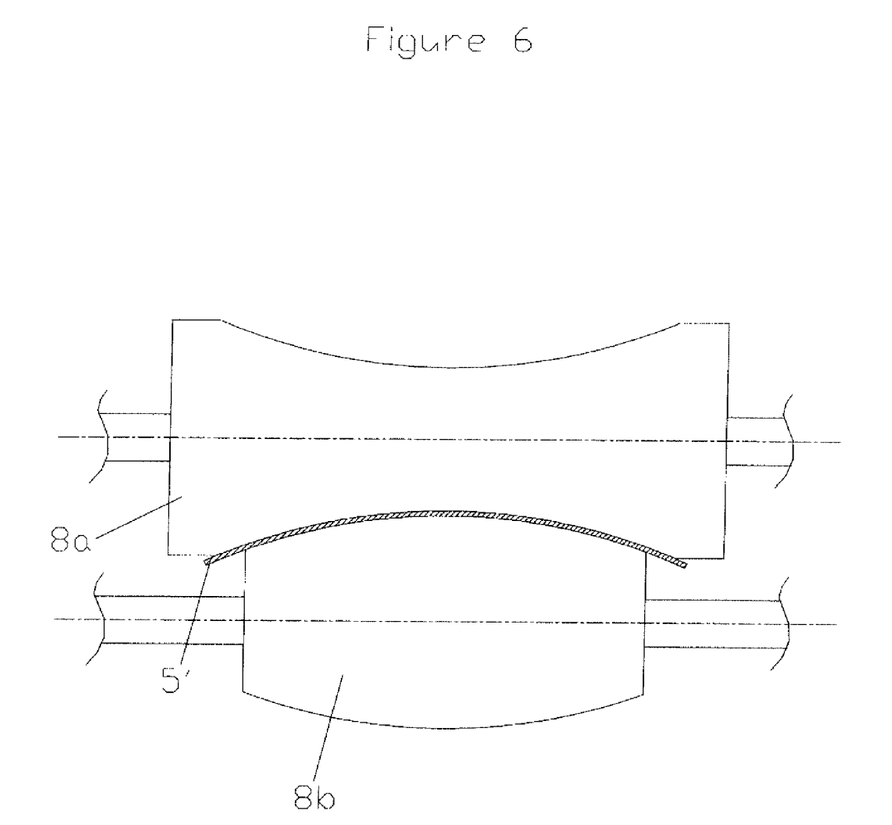
FIG. 6 is a partial section view along line 6-6 of FIG. 4A showing the section of the band and the counter-rotational rollers.
Figure 7:
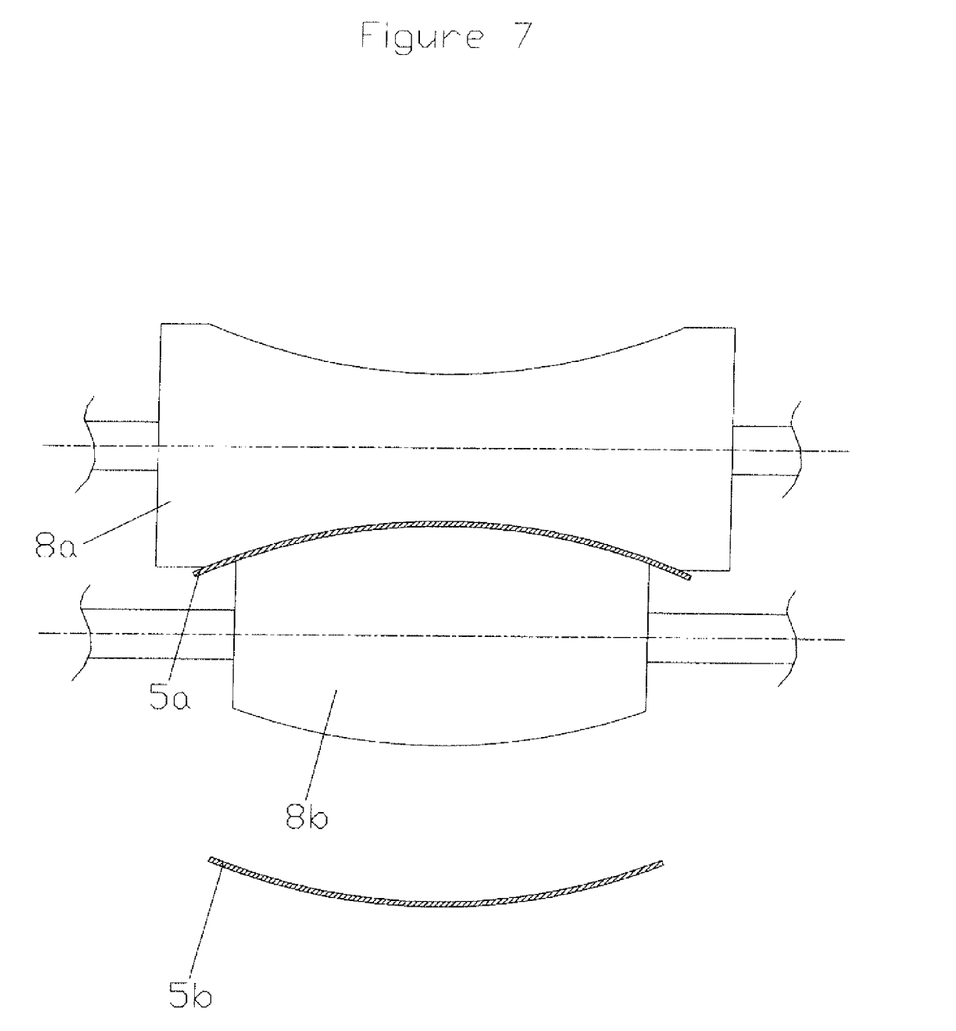
FIG. 7 is a partial section view along line 7-7 of FIG. 5A showing the section of the strips and the counter-rotational rollers.

According to the implementation shown in FIGS. 6 and 7, the upper roller (roller 8a) presents a concave profile and the lower roller (roller 8b) presents a convex profile.

Figure 5A:
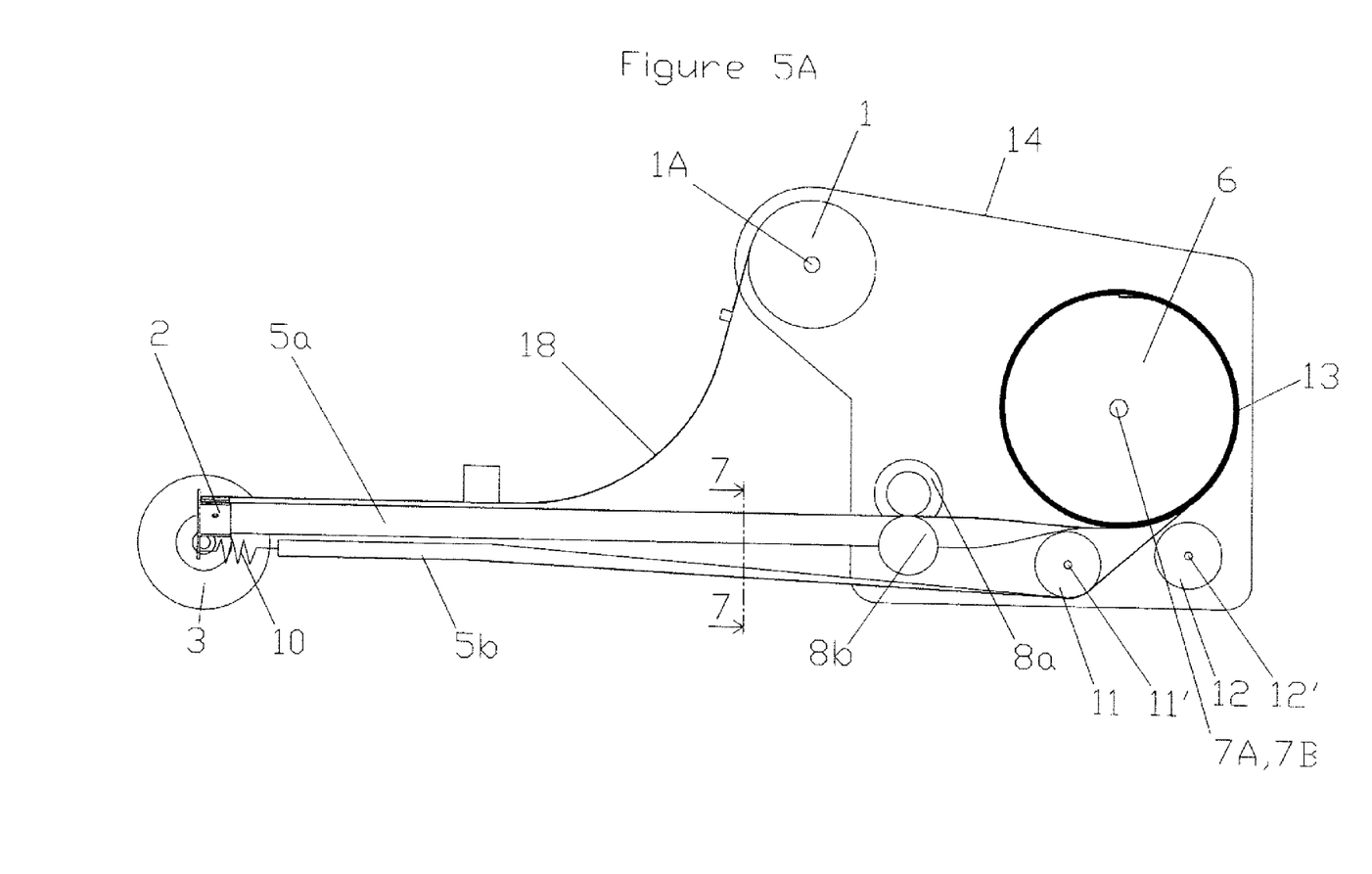
FIG. 5A is a section view along line 4-4 of FIG. 2, in schematic form, of another example of implementation of the harvesting device according to the invention according to which the means for deployment of the tarpaulin include bands formed by two superposed strips and where the means for moving the distal and of the tarpaulin on the ground are constituted by wheels.

In another implementation, each band is constituted by two flexible, superposed strips 5a, 5b the curvatures of which are, preferably, inversely oriented. This arrangement allows: —reinforcing the longitudinal rigidity of the bands;

—ensuring a better slide of the tarpaulin on the ground; and—preventing the lateral edges of the two strips from damaging the elements installed on the ground of the groves (olive groves or fruit orchards), such as watering pipes or others.

In this case, the superposed strips 5a, 5b are wound around the same drum. However, only the upper strip 5a is motor-driven (not shown on the drawings) during the deployment of the tarpaulin 18, said upper strip 5a being moved in longitudinal translation by the pair of counter-rotating rollers 8a, 8b between which it is engaged, the upper roller 8a being driven in rotation by a hydraulic motor or other, as indicated above. The deployment of the lower strip 5b is achieved by the traction exerted by the drive frames 2a, 2b installed at the distal end of the tarpaulin, which are themselves pushed towards the outside, by moving them away from the bearing structure under the thrust communicated by the distal end of the upper strip 5a.

The distal end of the lower strip is connected to the drive frames 2a, 2b through the intermediary of an elastic component, for example a spring 10 acting as a pulling force. A roller 11 guides the lower band 5b and prevents said lower band from interacting with the lower guide roller 8b of the upper band 5a. On the other hand, the elastic component 10 allows compensating the dimensional distortions due to the superposed winding of the two strips. A roller 12 with an axis 12' parallel to axis 11' of the roller 11 on which the lower band 5b rests when it leaves the winding 13 prevents an ill-timed unwinding of the lower band 5b.

The rollers 11, 12 are positioned in proximity of the winding drum 6. The respective axes 11', 12' of the rollers 11, 12 are, for example, connected to the bearing structure 14 of the device and are positioned parallel to the axes of the guide rollers 8a, 8b, to the winding axis 1A of the tarpaulin and to the rotational axis 7A, 7B of the drums 6. Incidentally, they are positioned upstream of the guide rollers 8a, 8b, in relation to the direction of deployment of the bands.

It is apparent that the rollers 8a, 8b, 11 and 12 have a width that is adapted to the width of the bands 5.

Each rigid and flexible band 5a, 5b is constituted by a metallic strip, for example made of steel, titanium, brass and preferably of stainless steel with spring action or shape memory.

According to another implementation, each rigid and flexible band 5a, 5b is constituted by a metal strip with spring action, preliminarily preformed in its concave shape by bending or profiling.

According to another characteristic disposition, each rigid band is constituted by an extruded concave strip of a composite material including fibers such as glass, carbon, Kevlar® or a mixture of this type of fibers.

The concavity of the rigid and flexible bands 5, associated with their width and with the intrinsic rigidity of the material making up these bands, condition the movement of the drive vehicles 2a, 2b in a direction perpendicular to the axis of the winding drums 6 of the bands 5. The same would be the case for other combinations of bands constituting the drives between the drive frame and the trailer, such as a simple band, a plurality of superposed rigid bands or a combination of rigid, juxtaposed and superposed bands. This system has therefore the advantage of ensuring a trajectory of the drive frames in a precise direction, while at the same time granting considerable operational latitude in the vertical plane so as to adapt their trajectory to the configuration of the ground.

Figure 8:
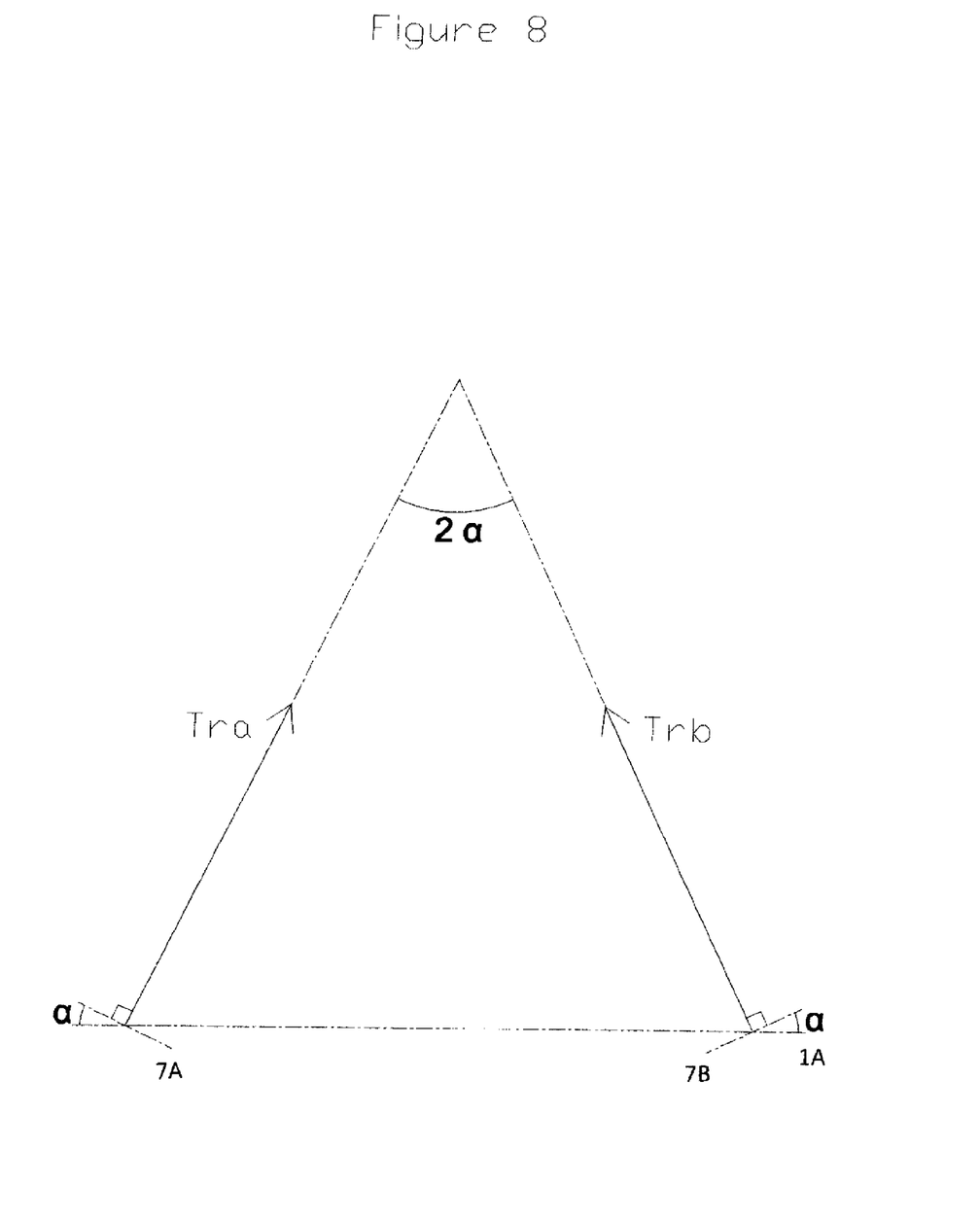
FIG. 8 is a schematic view illustrating the inclination of the winding drums.

According to another characteristic of the invention, the rotational axes 7A, 7B of the winding drums 6 of the bands 5 connected to the drive frames 2a, 2b, respectively, provided at the distal end of each of the two portions 18a, 18b of the tarpaulin, are very slightly misaligned in the horizontal plane, so as to communicate to the drive frames a convergent trajectory tending to bring together the edges delimiting the slit F at the end of deployment of the tarpaulin. This disposition allows closing the slit in the tarpaulin after having passed the tree trunk and to obtain reinforced tightness around the central opening C and between the edges of the portions 18a, 18b delimited by said median slit F. The angle obtained in this manner between the trajectory Tra, Trb of each drive frame with the median axis of the tarpaulin (or between the axis 1A of the winding shaft 1 and the axes 7A, 7B of the drums) is thus, for example, in the order of one degree, the trajectory of the drive frames then remaining in a direction essentially parallel to the median axis of the tarpaulin.

It is clear that, if one closes each rotational axis of the winding drums 6 of the bands 5 by an angle $\alpha$ with the rotational axis of the winding shaft 1 of the tarpaulin, the two drive frames 2a, 2b on the distal edge 18a', 19b' of the portions 18a, 18b of the tarpaulin are going to have a convergent trajectory equal to twice this angle $\alpha$, at the end of the trajectory which allows obtaining an effective overlapping of the edges of the median slit F of the tarpaulin 18.

According to one implementation, means are disposed around the winding drums 6 of the bands 5, at a distance from the periphery of the winding 13 formed around the shaft 7 of the drums, when said bands are completely wound around said drums. These means permit channeling the winding 13 of the bands around their drum 6. According to the implementation shown, these means consist of freely rotating rollers 15.

The winding shaft 1 of the tarpaulin 18 may be coupled to a motorization, such as for example, a hydraulic motor, in cooperation with the winding and unwinding device of said tarpaulin so as to slightly brake the tarpaulin during its deployment in order to control the speed of deployment by maintaining its tension and also to limit the friction of the tarpaulin on the ground during this phase, and to proceed to the retraction of the tarpaulin, the retraction-deployment device ensuring in this case a slight braking to go along with this retraction, then allowing to transport the fruit that had fallen on the tarpaulin to a collection device, or even a sorting system, located on the trailer.

Hereunder is given an example of application of the method and implementation of the deployment-retraction device of the tarpaulins for collecting the harvest of small fruit detached from the trees or bushes described above.

The machine, for example constituted by a trailer R supporting the bearing structure 1 of the device of the invention hooked up to a tractor T, moves between the rows of fruit trees and it is stopped and positioned, successively, facing each tree to be harvested. A vision system may be centered on the slit of the tarpaulin so as to send back to the driver of the machine an image of the proper positioning of the tarpaulin relative to the tree trunk. The machine may also advantageously be equipped with a vibrating clamp supported by a telescopic arm installed on the chassis of said machine, the shaking of the fruit trees may also be performed by operators equipped with portable manual tools (combs) or mechanized tools, or as shown on FIG. 1 of the attached drawings, by a self-propelled vehicle V equipped with a vibrating clamp.

Prior to being deployed, the tarpaulin is wound around its shaft 1 whereas the bands 5 are wound around their winding drum 6, its rotation being blocked to avoid any ill-timed unwinding of the band around the drum due to spring action, with the exception of an end part which is connected to the drive frames 2a, 2b. With the machine being immobilized facing the tree O to be harvested, the tarpaulin 18 is deployed on the ground, directly below the fruit-bearing branches of said tree, around the trunk of the latter.

One proceeds to the deployment of the tarpaulin by activating simultaneously and in a synchronized manner the drive motors for rotation of the drive roller of each pair of counter-rotational guide rollers which will then unwind the band by friction while controlling the regulation in the brake mode of the drives of the drum and the shaft of the tarpaulin and thus push each of the two drive frames 2a, 2b on the distal end of the tarpaulin 18 in a perpendicular or essentially perpendicular direction to the axis 1A of the winding shaft 1 of said tarpaulin and moving it away from said axis. The tarpaulin 18 is thus pulled and deployed until it is completely unfurled which is detected, for example, by a limit switch sensor capable of stopping the deployment of the tarpaulin or by a voluntary stop controlled by the operator. During this phase the drive motor of the winding shaft 1 of the tarpaulin 18 and the drive motors of the winding drums 6 of the bands 5 operate in the brake mode, thereby ensuring maintenance of the tension of the tarpaulin 18 and to keep the bands wound up on the drums 6, these braking actions being obtained by the use of means known as such.

At the end of the crop collecting phase, the operator orders the retraction of the tarpaulin by rewinding it on its shaft 1, by activating the drive motor of said shaft. The action is synchronized with the drive motors of the drums 6 which accompany the retraction of the tarpaulin and which are thus regulated to rewind the bands 5, the drive motors for rotating the driving roller of each pair of guide rollers 8a, 8b being then in the free rotation mode, leaving the guide rollers to simply accompany the transition of the bands from their concave shape to their flat shape.

In this operating phase, the rewinding of the tarpaulin is controlled by the drive motor of the winding shaft 1 of the tarpaulin 18.

It is also emphasized that, in the retraction phase, it is the drives of the winding shaft 1 of the tarpaulin 18 which are activated to retract said tarpaulin around its rotary winding shaft. However, the tarpaulin is fastened to the drive frames 2a, 2b the movement of which is dependent on the retraction of the band(s) 5 onto their winding drums 6. To avoid blocking the retraction of the tarpaulin, the winding drum motor is servo-driven to accompany the retraction of the tarpaulin 18 by retracting the bands at an adapted speed so that the drive frames 2a, 2b accompany the retraction of the tarpaulin so as to keep said tarpaulin at a slight tension during this phase of retraction. The driving means coupled to one of the rollers of the pairs of counter-rotating guide rollers 8a, 8b are, as far as they are concerned, disengaged to freely accompany the retraction of the bands 5.

In the deployment phase of the tarpaulin, as seen before, it is the drives coupled to the driven guide rollers of the pairs of rollers 8a, 8b which deploy the bands by friction. The motors coupled to the winding drums 6 of the bands 5 and to the winding shaft 1 of the tarpaulin 18 operate in the braking mode in order to, on the one hand, keep the bands firmly on their drums (and thereby avoid their untimely unfurling through spring action) and, on the other hand, to maintain the tarpaulin in slight tension (and thereby avoid its sudden deployment in accordion style and rubbing too heavily on the ground).

It is noted that maintaining the tarpaulin in tension could be achieved by any other means. For example, elastic elements known as such, like spiral springs connected to the winding shaft 1 of the tarpaulin 18 which are compressed during the deployment phase by the tarpaulin being pulled by the drive frames, and which ensure the traction of the tarpaulin by their relief during the retraction phase of the tarpaulin. It could also be done by a torsion spring inserted into the shaft 1 of the tarpaulin 18.

These means are secondary to the drives acting on the drive frame(s) 2a, 2b and allow controlling the retraction phase of the tarpaulin by regulating the retraction drives of the bands 5 and to be regulated by the deployment drives of the band in the deployment phase of the tarpaulin.

Figure 5B:
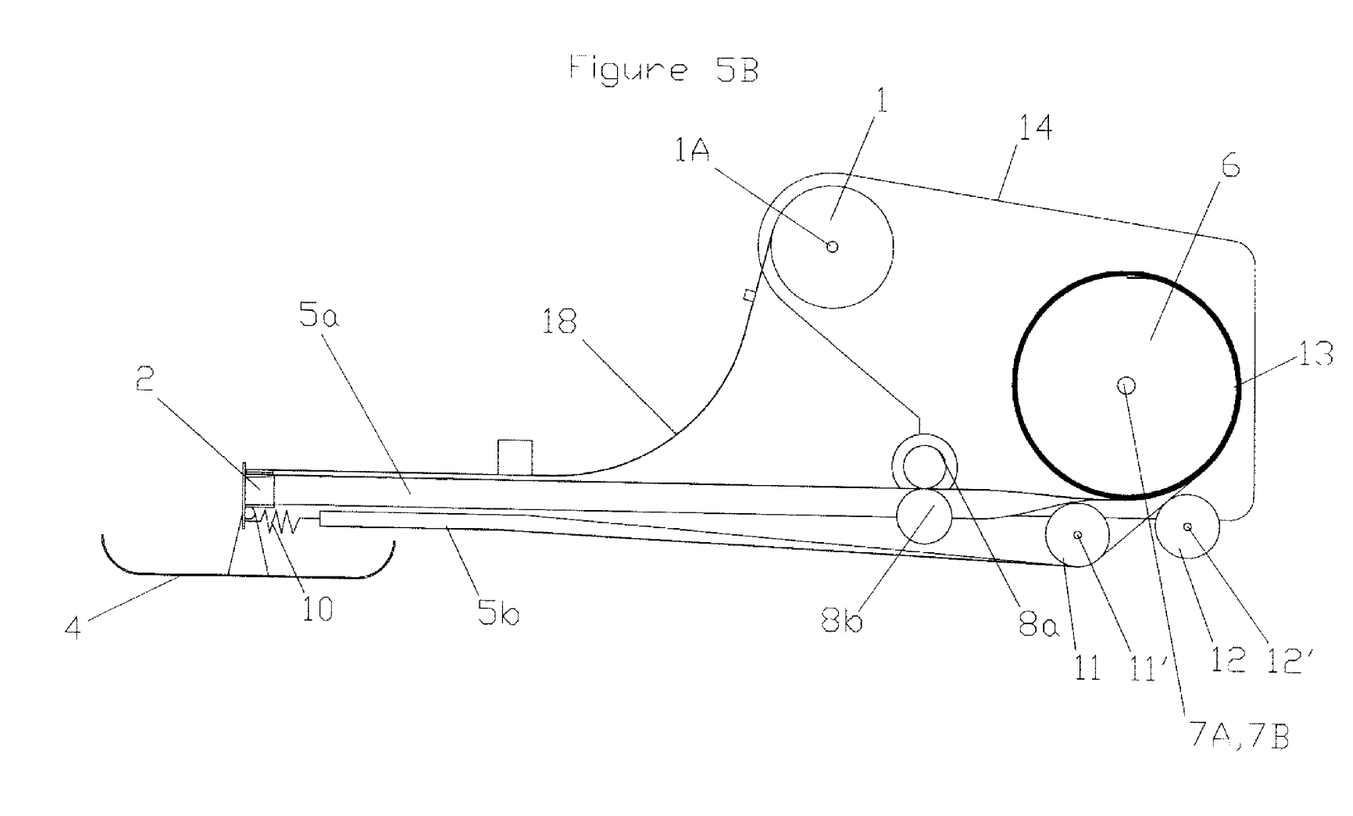
FIG. 5B is an analog view of FIG. 5A and in which the means for moving the distal end of the tarpaulin on the ground are constituted by a skid.

Operation of the implementation shown in FIGS. 5A, 5B is essentially the same as the one that was just described.

No description is made of the motorization activating the active elements of the device or of the control or management apparatus of this motorization, or of the distribution circuits since these are familiar to the experts.

The invention concerns also a method for harvesting small fruit detached from fruit trees or bushes, by means of a pliable tarpaulin 18 deployed on the ground, under the fruit-bearing branches or fruit trees to be harvested, and rewinding around a rotary shaft 1 coupled to a motorization ensuring its rewinding, this tarpaulin including a proximal end fastened to said rotary shaft and a distal end, this method being remarkable in that the deployment of the tarpaulin is obtained by means of at least one and preferably by a plurality of bands 5 having a capacity of bending and of shape memory, wound around one or several winding drums 6 with rotational axis 7A, 7B parallel or essentially parallel to the rotational axis 1A of the winding shaft 1 of the tarpaulin 18, and the distal end of which is connected to the distal end of the tarpaulin, the unfurled part 5' of the bands 5 acquiring automatically, as they unwind, a straight shape and a property of rigidity thanks to which their distal end is capable of exerting thrust on the distal end of the tarpaulin and to move said distal end in the direction of the outside of the bearing structure 4 while performing the deployment of said tarpaulin.

The deployment of the tarpaulin 18 is obtained by the motorized unwinding of the bands 5, the winding shaft 1 of the tarpaulin being coupled to a motorization exerting a braking action during this phase of deployment, whereas the rewinding or retraction of the tarpaulin is achieved by said motorization coupled to the winding shaft of said tarpaulin, the winding drum(s) 6 of the bands 5 being coupled to drives ensuring the retraction of the bands simultaneously with the retraction phase of the tarpaulin.

The invention also concerns the harvesting machines for small fruit featuring a harvesting device including one or several of the characteristics described in the present description.

The invention claimed is:

1. An apparatus for harvesting small fruit detached from fruit trees or bushes, the apparatus comprising:
   a tarpaulin having a distal end and a proximal end;
   a winding shaft fastened to said proximal end of said tarpaulin;
   a first bearing structure supporting said winding shaft;
   a rotary drive motor coupled to said winding shaft;
   at least one band having a bending and shape memory;
   a winding drum connected to one end of the band; and
   a second bearing structure supporting said winding drum, said winding drum having an axis positioned parallel to a rotational axis of said winding shaft, the band being spiral wound around said winding drum, the band having an opposite end connected to the distal end of said tarpaulin, a deployed portion of the band assuming a straight shape with rigidity during unwinding of the band, a distal end of the band pushing the distal edge of said tarpaulin so as to move said tarpaulin away from said winding shaft so as to deploy said tarpaulin above the ground.

2. The apparatus of claim 1, further comprising:
at least one drive frame connecting the distal end of the band to the distal end of said tarpaulin.

3. The apparatus of claim 2, said tarpaulin having a median slit that extends from the distal end to said tarpaulin to an opening formed in a center of said tarpaulin.

4. The apparatus of claim 3, said winding drum being slightly skewed in a horizontal plane so as to cause the drive frame to have a trajectory which beings together edges of said median slit at an end of the deployment of said tarpaulin so as to close said median slit, said opening and said median slit adapted to cause a tight fit around a trunk of a tree located between edges of said median slit.

5. The apparatus of claim 2, said drive frame having wheels or skids that support said drive frame above the ground.

6. The apparatus of claim 1, said winding drum having a drive that allows for winding of the band around said winding drum.

7. The apparatus of claim 1, said tarpaulin being at a light tension during deployment and retraction.

8. The apparatus of claim 7, further comprising:
a drive coupled to said winding shaft, said drive being servo-driven.

9. The apparatus of claim 1, further comprising:
a pair of counter-rotational guide rollers adjacent to said winding drum, the band being engaged between said pair of counter-rotational guide rollers so as to be driven by friction by said pair of counter-rotational guide rollers.

10. The apparatus of claim 9, each of said pair of counter-rotational guide rollers having a profile that creates a flat shape of the band while retracted and a crown shape when deployed.

11. The apparatus of claim 10, one roller of said pair of counter-rotational guide rollers being an upper roller having a concave profile, another roller of said pair of counter-rotational guide rollers being a lower roller having a convex profile.

12. The apparatus of claim 1, the band comprising a pair of superposed strips, one of said pair of superposed strips being an upper strip, another of said pair of superposed strips being a lower strip connected to a drive frame.

13. The apparatus of claim 12, further comprising:
at least one roller having an axis parallel to an axis of said winding drum in proximity to the axis of said winding drum, the roller guiding said lower strip.

14. The apparatus of claim 12, said lower strip being connected to a drive frame by an elastic element.

15. The apparatus of claim 1, said band being a metallic strip.

16. The apparatus of claim 1, said band being preformed into a concave shape.

17. The apparatus of claim 1, said band being an extruded concave strip of composite fibrous material.

18. A machine for harvesting small fruit comprising the apparatus of claim 1.

* * * * *